March 18, 1941.  C. M. ASHLEY  2,235,004
AIR CONDITIONING APPARATUS
Filed April 6, 1938
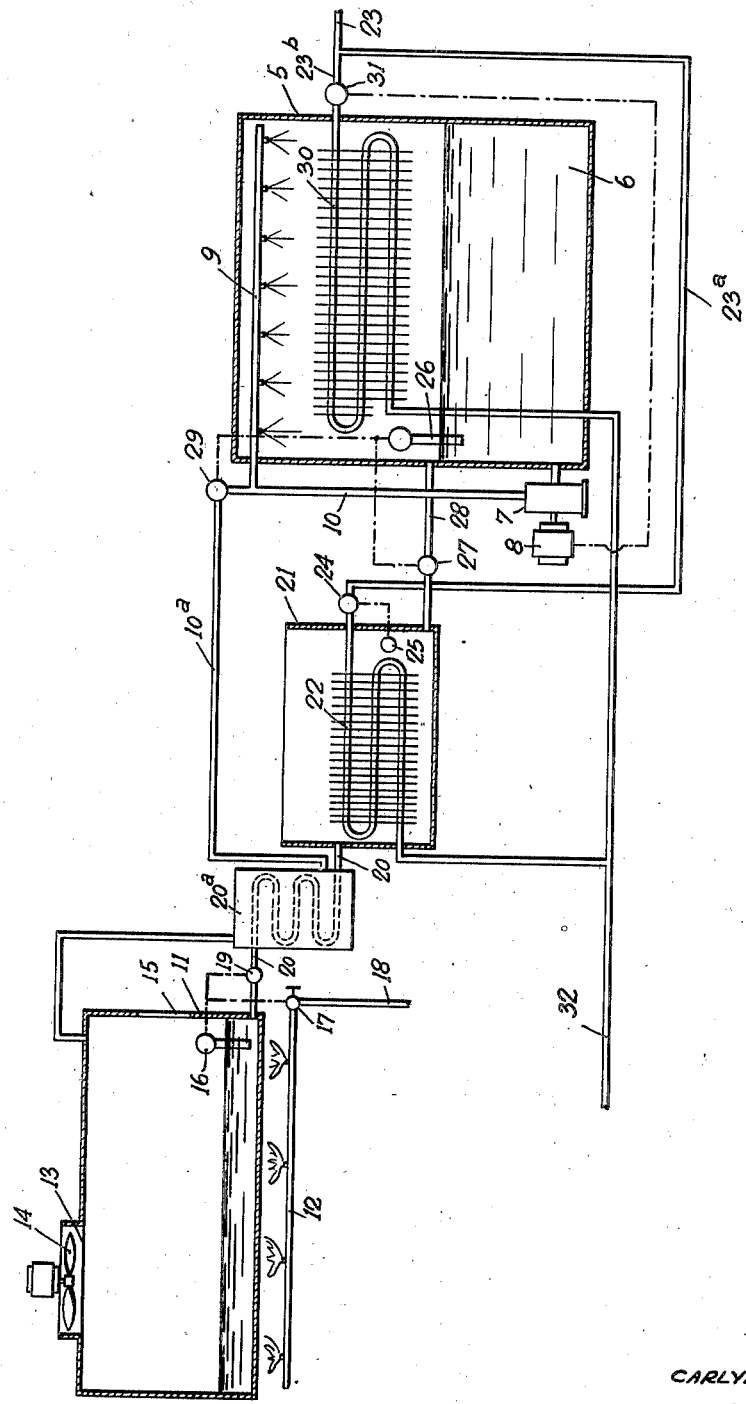
INVENTOR.
CARLYLE M. ASHLEY
BY Herman Seid
ATTORNEYS.

Patented Mar. 18, 1941

2,235,004

UNITED STATES PATENT OFFICE 2,235,004

AIR CONDITIONING APPARATUS

Carlyle M. Ashley, Syracuse, N. Y., assignor to Carrier Corporation, Syracuse, N. Y., a corporation of Delaware Application April 6, 1938, Serial No. 200,494

2 Claims. (Cl. 261—3)

This invention relates to air conditioning.

The general object of the invention is to provide an air conditioning apparatus for controlling the moisture content of air or other gas which is to be conditioned.

In the conditioning of enclosures occupied by persons whose comfort and health are primary considerations, it is necessary that a quantity of outdoor air be supplied to such enclosures at all times, in order to meet the ventilation requirements of the occupants. Under summer operating conditions in most localities the fresh air thus supplied is usually hot and humid and hence requires reduction of its moisture content in order that it may be used to create and maintain comfortable atmospheric conditions within the enclosures. Also, in cooling enclosures for comfort, it is common practice to recirculate a portion of the air withdrawn from the enclosure. In conventional installations the quantity of air thus recirculated may be of the order of four or five times the quantity of fresh air introduced into the enclosure. In its circulation through the occupied enclosure, the conditioned air is subject to a substantial increase in moisture content, due to the evaporation of water from the bodies of the occupants, as is well understood. Thus, in order that it may be suitably prepared for resupply to the enclosure, this air withdrawn from the enclosure for recirculation must also have its moisture content reduced in order that comfortable atmospheric conditions may be created and maintained in the enclosure.

Similarly, in certain industrial applications of air conditioning it is necessary to remove moisture from the air in order to provide desired atmospheric conditions.

Reduction of the moisture content of the air may be accomplished broadly by either of two methods, namely, dehumidification and dehydration. When the air is dehumidified, it is subjected to heat exchange with a cooling medium or refrigerant which reduces the dry bulb temperature below the original dewpoint of the air, thus precipitating moisture from the air. This method has the disadvantage that the cooling process and the process of moisture reduction are definitely and inseparably interrelated, thus creating control problems. Further, the air which has been dehumidified is necessarily at a relatively low dry bulb temperature and hence, in most applications, must be reheated before it may be introduced into the enclosure to be conditioned.

An object of the present invention is to provide an apparatus and method for reducing the moisture content of air to be conditioned by dehydration, without cooling the air. Thus, the necessity for reheating is eliminated. Also, the process of moisture reduction is divorced from the process of controlling the temperature, so that these may be controlled independently. Accordingly, control problems are simplified.

Another object of the present invention is to provide an improved apparatus for and method of conditioning air in which a liquid absorber is used. This process is based upon the fact that solutions of hygroscopic salts as, for example, lithium chloride and calcium chloride, when they are brought in contact with air having a higher vapor pressure, will absorb moisture from the air with which they contact. As such a solution absorbs moisture from the air, due to the difference in the respective vapor pressures of the solution and of the air, the solution is diluted so that its vapor pressure is increased and its capacity for absorbing water from the air is decreased. In order that the solution may be kept at the proper strength, heat must be supplied to the solution in sufficient amount to evaporate excess moisture from the solution.

Accordingly, a feature of the invention resides in the provision of means for evaporating moisture from an absorber solution, thus to increase the density and vapor pressure of the solution, whereby it may function effectively to absorb moisture from air with which it is contacted.

Another feature of the present invention resides in circulating a volume of absorber solution in contact with air to be conditioned, and, whenever the concentration of said circulated solution falls below a predetermined minimum, withdrawing a portion of said solution for concentration and supplying concentrated solution to be circulated in contact with said air.

Other objects and features of the invention will become more apparent from the following description to be read in connection with the accompanying drawing which diagrammatically illustrates one embodiment of the invention.

Referring to the drawing, the numeral 5 designates generally a casing through which there is circulated air to be conditioned. The casing 5 is provided with a sump 6 adapted to receive and contain a suitable absorber solution such as lithium chloride, calcium chloride or the like. A pump 7, driven by a motor or the like, 8, serves to withdraw absorber solution from the sump 6 and supply it to the spray device 9 through supply pipe 10. The lithium chloride or other absorber solution sprayed from spray device 9 passes in intimate contact with the air circulated through casing 5 and absorbs moisture therefrom. The sprayed solution together with the moisture absorbed from the air returns to the sump 6.

Supply pipe 10 is provided with a branch 10a connecting with a regenerating container generally designated 11. Solution delivered to the regenerator 11 through pipe 10a is heated by a heating means, such as gas burner 12, whereby to drive off from the solution moisture absorbed from the air, thus to increase the concentration of the solution and to prepare it for a repetition of its moisture absorbing function. The regenerating chamber 11 is provided with an outlet opening 13 which permits the escape of water evaporated from the solution within the container 11. If desired, a fan 14 may be utilized in the outlet opening to assist the withdrawal of vapor from the chamber 11, and an inlet opening 15 may be provided for supplying air to the regenerating chamber 11. The air thus circulated through the regenerating chamber picks up the moisture evaporated from the solution contained in the regenerating chamber and removes it from the system. If desired, the inlet opening 15 may be sufficiently small or sufficiently restricted in any suitable manner (as, for example, by dampers) so that when the fan 14 is operative, the pressure within the regenerating chamber will be lowered somewhat below atmospheric pressure. In this way, the boiling point of the water in the absorber solution will be lowered and the evaporation of such moisture facilitated.

Within the regenerating chamber 11 there is provided a density-responsive control device 16, such as a hydrometer, which serves to open valve 17 in fuel supply line 18 whenever the density of the solution in chamber 11 falls below a predetermined point. Thus, when concentration of the fluid in chamber 11 is required, gas will be supplied to the burner device 12 to supply the heat necessary to effect this result.

Device 16 also controls valve 19 to regulate the emission of regenerated solution to interchanger 20a. So long as the solution in chamber 11 is below a desired density, device 16 will maintain valve 19 closed, and valve 17 open in order to regenerate the solution.

When the solution has attained a predetermined density, valve 17 will be closed to interrupt the supply of fuel for regeneration and valve 19 will be opened.

Thus, whenever the density of the solution in chamber 11 is sufficiently high so that such solution may be effectively used for air conditioning purposes, the control device 16 operates to open valve 19 in line 20, thus to permit solution to flow from regenerating chamber 11 into cooling tank 21. Preferably, line 20 is routed through an interchanger 20a where the solution passing from the regenerating chamber 11 is subjected to heat exchange with the solution passing to chamber 11 for regeneration. Thus, the solution to be regenerated is preheated prior to its entry into the regenerating chamber 11, and the regenerated solution to be cooled is precooled before its delivery to the cooling tank 21. Tank 21 is preferably at a lower level than regenerating chamber 11 so that the solution may flow to the cooling tank 21 by gravity. Within the cooling tank 21 is positioned a cooling device 22 of any suitable design. Preferably, this constitutes a multiple pass coil provided with extended surface, such as spiral or plate finning. Cooling medium, such as cold water or the like, from any suitable source is supplied to the cooling device 22 through main supply line 23 and branch supply line 23a. A valve 24 in line 23a serves to admit water to cooling device 22 whenever the temperature of the solution in cooling tank 21 is above a predetermined maximum. This is accomplished by providing a thermostat 25, responsive to the temperature of the solution, for controlling the operation of valve 24.

Within the air conditioning unit 5 there is provided a density-responsive device 26, such as a hydrometer or the like, reflecting changes in the density of the absorber solution circulated in contact with the air passing through the air conditioner. Whenever the density falls below a predetermined point, hydrometer 26 serves to open valve 27 in line 28, thus to supply to the sump 6 of the air conditioning unit absorber solution having a desired temperature and concentration. Whenever the valve 27 is opened by the hydrometer 26, the latter also serves to open valve 29 in branch line 10a. Thus, as fresh solution is supplied to the sump 6, diluted absorber solution is withdrawn therefrom and returned to the regenerator 11 for reconcentration. If desired, the valves 27 and 29 may be of the type which, whenever they are opened, remain open for a predetermined period of time and then automatically close. If the valves are of this type, then the valves will be opened a sufficient number of times to insure the return of the absorber solution in the sump 6 to a predetermined density.

Since the dehydration of the air by the action of the absorber solution serves to release the latent heat of vaporization of the moisture thus precipitated, there is a tendency for the sensible heat of the dehydrated air to be increased. To counteract the rise in dry bulb temperature, which would thus occur, there is preferably provided in the path of the dehydrated air a cooling device 30, such as a cooling coil provided with extended surface. The coil 30 may be served by the line 23 which also supplies cooling medium to the cooling coil 22, the supply line 23 and coil 30 being connected by branch supply line 23b. A valve 31 in branch 23b is preferably arranged to supply cooling medium to the coil 30 whenever the motor 8, operating pump 7, is operative.

The moisture content of the conditioned air will be maintained at a predetermined value determined by the concentration of absorber solution which is maintained in the sump 6, and by the effective operating temperature of the solution contacting the air.

If desired, the coil 30 may be positioned within the casing 5 at a point beyond that at which the air being conditioned is contacted by spray from header 9. However, it is preferred to place the coil 30 beneath the spray header 9, since this materially increases the operating efficiency of the apparatus. The sprayed solution falling upon the coil 30 serves to wet the same and thereby to increase the heat transfer through the walls of the coil. Further, the coil thus provides a surface over which the absorber solution spreads in the form of thin film which increases the effective dehydration of the air passing in contact therewith since, in the aggregate, this film provides a larger contact area than if the liquid from which it is formed were precipitated as a spray. Further the cooling of the sprayed solution by its contact with the coils in this manner further increases the moisture-absorbing effectiveness of the sprayed solution.

It will be noted that the coils 30 and 22 are connected in parallel to the supply line 23 and the discharge line 32. Thus, the operation of these coils is entirely separate and distinct. A series connection may be used if desired.

If desired, the hydrometer 26 may serve to control only valve 29, instead of both valves 27 and 29. In such case, a desired liquid level may be maintained in sump 6 by controlling valve 27 by a suitable float device within the sump which may be of any well-known type.

Since many changes may be made in the invention without departing from its scope, it is intended that all matter contained in the above description or shown in the accompanying drawing shall be interpreted as illustrative only and not in a limiting sense, applicant limiting himself only as indicated in the appended claims.

I claim:

1. In combination, for air conditioning an enclosure, a conditioning chamber, an air inlet and an air outlet for the conditioning chamber, spray apparatus within the chamber for distributing an absorber solution, a cooling coil within the chamber over which the solution is sprayed, a sump at the bottom of the chamber, a pump for supplying solution from the sump to the spray apparatus, means simultaneously operative for admitting water to said cooling coil when said pump becomes operative, a solution supply chamber operatively associated with the conditioning chamber, a cooling coil in said solution supply chamber, means for controlling the action of said last mentioned cooling coil to govern the temperature of solution in the solution supply chamber, a solution interchanger chamber, a regenerator chamber operatively associated with the interchanger chamber, means operatively responsive to the condition of the solution in the conditioning chamber for admitting a measured volume of cooled, regenerated solution to the conditioning chamber from the solution supply chamber and simultaneously removing a corresponding volume of diluted solution from the conditioning chamber to the regenerator chamber, means connecting the solution interchanger chamber with the solution supply chamber and the regenerator chamber whereby regenerated solution will flow from the regenerator chamber through the interchanger chamber into the solution supply chamber, means connecting the interchanger chamber with the conditioning chamber and the regenerator chamber whereby solution from the conditioning chamber will flow through the interchanger chamber to the regenerator chamber, and means for routing regenerated uncooled solution from the regenerator chamber and returning diluted solution from the conditioning chamber in interchange relationship through said interchanger chamber.

2. In combination, for air conditioning an enclosure, a conditioning chamber, an air inlet and an air outlet for the conditioning chamber, spray apparatus within the chamber for distributing an absorber solution, a cooling coil within the chamber over which the solution is sprayed, a sump at the bottom of the chamber, a pump for supplying solution from the sump to the spray apparatus, means simultaneously operative for admitting water to said cooling coil when said pump becomes operative, a solution supply chamber operatively associated with the conditioning chamber, a cooling coil in said solution supply chamber, means for controlling the action of said last mentioned cooling coil to govern the temperature of solution in the solution supply chamber, a solution interchanger chamber, a regenerator chamber operatively associated with the interchanger chamber, means operative responsive to the condition of the solution in the conditioning chamber for admitting a measured volume of cooled, regenerated solution to the conditioning chamber from the solution supply chamber and simultaneously removing a corresponding volume of diluted solution from the conditioning chamber to the regenerator chamber, means connecting the solution interchanger chamber with the solution supply chamber and the regenerator chamber whereby regenerated solution will flow from the regenerator chamber through the interchanger chamber into the solution supply chamber, means connecting the interchanger chamber with the conditioning chamber and the regenerator chamber whereby solution from the conditioning chamber will flow through the interchanger chamber to the regenerator chamber, means for routing regenerated uncooled solution from the regenerator chamber and returning diluted solution from the conditioning chamber in interchange relationship through said interchanger chamber, and means for controlling the pressure in the regenerator chamber.

CARLYLE M. ASHLEY.